(12) United States Patent
Andenna et al.

(10) Patent No.: US 7,634,382 B2
(45) Date of Patent: Dec. 15, 2009

(54) DIAGNOSTIC DEVICE FOR USE IN PROCESS CONTROL SYSTEM

(75) Inventors: Andrea Andenna, Baden (CH); Andrea Moroni, Gorla Minore (IT); Giovanni Invernizzi, Melzo (IT)

(73) Assignee: ABB Research Ltd, Zurich (CH)

( * ) Notice: Subject to any disclaimer, the term of this patent is extended or adjusted under 35 U.S.C. 154(b) by 13 days.

(21) Appl. No.: 11/878,738

(22) Filed: Jul. 26, 2007

(65) Prior Publication Data

US 2008/0033693 A1    Feb. 7, 2008

Related U.S. Application Data

(63) Continuation of application No. PCT/CH2005/000084, filed on Feb. 15, 2005.

(51) Int. Cl.
*G06F 17/00*     (2006.01)

(52) U.S. Cl. .................. 702/179; 702/81; 702/182; 702/116

(58) Field of Classification Search .......... 702/178, 702/81, 182, 104, 45, 116; 700/28, 275; 73/861.357

See application file for complete search history.

(56) References Cited

U.S. PATENT DOCUMENTS

| 5,987,398 | A | 11/1999 | Halverson et al. |
| 6,601,005 | B1 | 7/2003 | Eryurek et al. |
| 2002/0029130 | A1 | 3/2002 | Eryurek et al. |
| 2004/0193387 | A1 | 9/2004 | Jinyama |

OTHER PUBLICATIONS

International Search Report for PCT/CH2005/000084, dated Oct. 28, 2005.

*Primary Examiner*—Drew A Dunn
*Assistant Examiner*—Hien X Vo
(74) *Attorney, Agent, or Firm*—Buchanan Ingersoll & Rooney PC

(57) ABSTRACT

A method and diagnostic device are disclosed which can receive process variable values ($x(t)$) of a process variable of a process medium of a process, and extract and record measurement statistics data from such process variable values, which are measured during a measuring phase. Training statistics data can be extracted and recorded from such process variable values, which are measured during a training phase. The measurement statistics data can be compared with training statistics data recorded before the measurement statistics data. The training statistics data can include a training empirical statistical distribution, which can be a distribution of a function of process variable values, which are measured during a training phase, or a distribution of a function of coefficients $X_t(k)$, which are coefficients of a function of a transform of process variable values ($x(t)$), which are measured during a training phase.

18 Claims, 5 Drawing Sheets

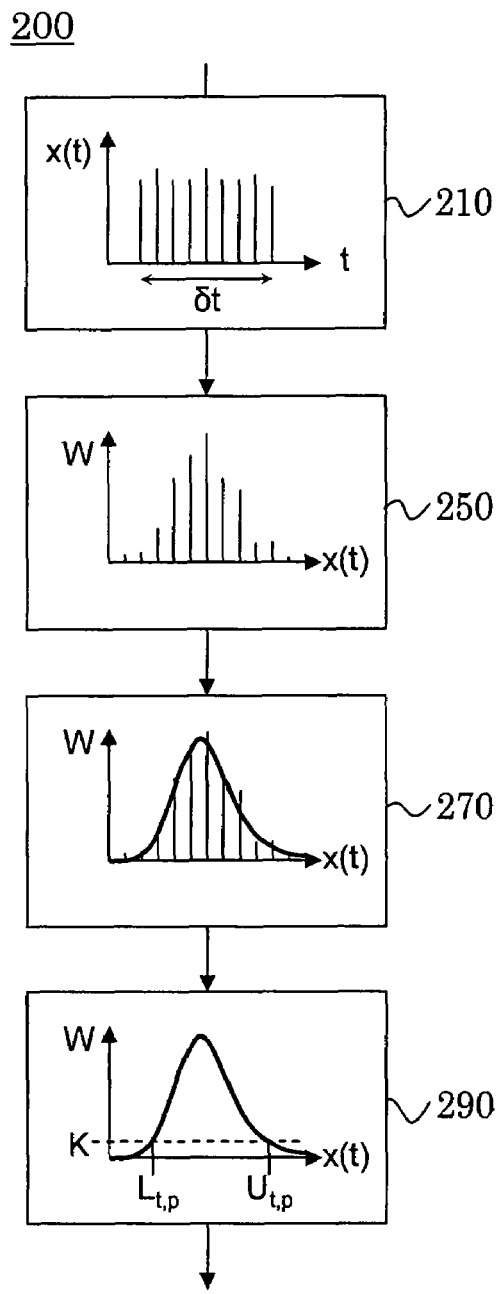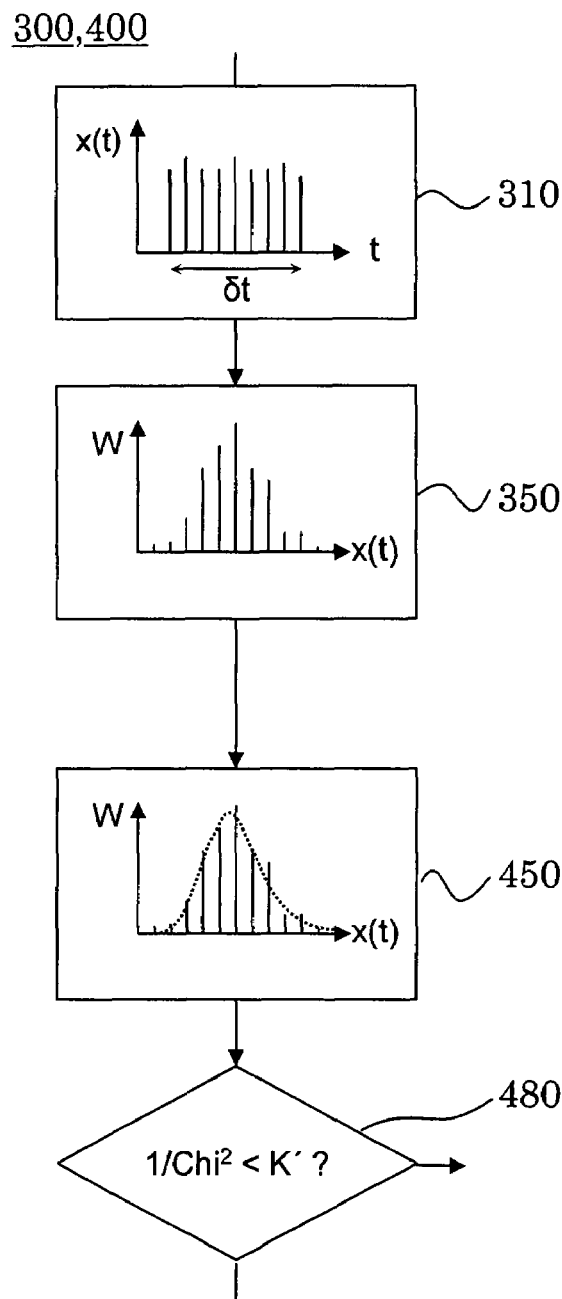
Fig. 6
Fig. 8

DIAGNOSTIC DEVICE FOR USE IN PROCESS CONTROL SYSTEM

RELATED APPLICATIONS

This application claims priority under 35 U.S.C. §120 to PCT/CH2005/000084 filed as an International Application on Feb. 15, 2005, designating the U.S., the entire contents of which are hereby incorporated by reference in their entireties.

TECHNICAL FIELD

The disclosure relates to the field of diagnostics of process devices, such as they are used in industrial or scientific processes, and in particular to the field of process device diagnostics using a sensed process variable of the process.

BACKGROUND INFORMATION

Such a diagnostic device and diagnostic method is known from the patent publication U.S. Pat. No. 6,601,005. The device senses process variable values like, e.g., pressure or flow values, and processes them so as to extract from them vibration noise signals carried in a process medium (e.g., liquid, gas) of the process. Such a vibration-related processed signal is then evaluated, with the evaluation ending in an output indicating that some control device (e.g., a pump or valve) of the process has a failure.

In the method disclosed in the afore-mentioned U.S. Pat. No. 6,601,005 it is suggested to use wavelet or Fourier transform or a neural network or statistical analysis, or other signal evaluation techniques for obtaining the processed signal. As far as the evaluation of the processed signal is concerned, it is suggested to compare the processed signal or signals to a choosable limit value or a set of limit values. For example, if a wavelet transform has been used for obtaining the processed signal, it will be checked for each calculated wavelet coefficient, if it has exceeded a corresponding limit value. If at least one wavelet coefficient has exceeded its corresponding limit value, a failure (of some control device or devices, to which the wavelet coefficient relates) will be indicated.

Furthermore, it is disclosed in the afore-mentioned U.S. Pat. No. 6,601,005 to remove known process variations, which can be due to certain process activities, from the process variable values. This is done by subtracting modeled data from data (process variable values) gathered during operation. It is expected that after the subtraction only abnormalities remain and are evaluated. If, e.g., the known process variations are due to environmental temperature changes, which occur during the day and which influence the process variable values, a number of data sets can be taken at different times during the day when the process works failure-free. These base "plane" normal operation data sets are employed as modeled data sets, from which, e.g., a neural network can choose the appropriate one, which then is substracted from data gathered during operation so as to let only abnormal signals remain. The models and the data gathered during operation are both wavelet transformed data, so that corresponding wavelet coefficients are subtracted from each other in order to remove the known process variations and yield values to be compared to prescribable limit values.

The choice of the limit values to which a processed signal is compared, is very important for the reliability of the output of the diagnostic device ("failure"/"no failure"). It is desirable to provide for reliable grounds for the diagnostic output of the diagnostic device.

SUMMARY

Therefore, a goal of the invention is to create a diagnostic device and a diagnostic method that provide for reliable grounds for a diagnostic output of the diagnostic device. It is furthermore a goal of the invention to create further devices and systems that incorporate this diagnostic device or diagnostic method.

The problem is solved by apparatuses and the methods as disclosed.

According to the invention, the diagnostic device comprises

- a receiving means for receiving process variable values of a process variable of a process medium of a process,
- a measurement processing means for extracting and recording measurement statistics data from such process variable values, which are measured during a measuring phase,
- a training processing means for extracting and recording training statistics data from such process variable values, which are measured during a training phase, and
- a comparison means for comparing the measurement statistics data with training statistics data recorded before the measurement statistics data.

Through this, it is possible to provide for reliable grounds for the diagnostic output of the diagnostic device. In particular, it is possible to provide for a prescribable reliability of the diagnostic output of the dignostic device and/or it is possible to provide for a confidence level of the output (indication of certainty of the output "failure"/"no failure").

The diagnostic device can be any device or combination of devices, which is capable of receiving process variable values and processing them in a depicted way. It can be a transmitter, a process monitoring device or process monitoring system, a controller or process control system, a personal computer or the like. The diagnostic device is preferably suitable for use in a process control system. It can be implemented in a control system. The diagnostic device can be integrated in a transmitter, in a process monitoring device, in a controller or the like. The diagnostic device can, e.g., be realized in a flowmeter, a pressure transmitter or differential pressure transmitter.

In a preferred embodiment the diagnostic device comprises a sensing means for measurement of the process variable and for generating the process variable values. The generated process variable values can then be output to the receiving means. Due to the sensing means the diagnostic device can simultaneously have the function of a transmitter and/or process monitor. The diagnostic device can be used as a stand-alone process device.

The receiving means receives process variable values and can, e.g., be an interface or port, realized in hardware and/or software. Possible process variables include flow, pressure, differential pressure, level, temperature or the like. Process variable values are values of a process variable or values of a measure related to the process variable, e.g., there can be a some functional (e.g., linear) relation between the process variable values and the respective values of the process variable in a given unit.

The process medium typically is a fluid. In particular, it can be a gas or a liquid or a mixture of those or a mixture of those plus solid components, e.g., an emulsion.

The measurement processing means is a means (realized in hardware and/or software) for processing process variable values measured (captured) during a measuring phase, in such a way that measurement statistics data are generated from the process variable values. The processing can include various types of calculations, e.g., arithmetics and transforms like Fourier or wavelet transform. The measurement statistics data are recorded (stored) for further output or processing.

With "measuring phase" a span of time and/or a mode of the diagnostic device is denoted, in which the diagnostic device does its "normal" function, i.e., diagnose. This is the normal operating status of the diagnostic device, in which the diagnostic device is usually used. During the measuring phase, the diagnostic device can diagnose the process and, in particular, detect a failure in the process, e.g., a failure of a process device or even a failure of a transmitter or other process device in which the diagnostic device is integrated.

With "training phase" a span of time and/or a mode of the diagnostic device is denoted, in which the diagnostic device receives process variable values, which are expected to be representative of a normal (typically failure-free) operation of the process. This is to receive statistical information about the process, which later on can be compared to statistical information about the process captured during a measuring phase.

Measurement statistics data are statistical information derived from process variable values that are captured or measured during a measuring phase. The measurement statistics data can be an item or a group of items selected from a group comprising mean value (e.g., arithmetic mean), root mean square, standard deviation, variance, statistical distribution. It can also be a value or set of values derived from one or more members of that group. The statistical distribution can be an empirical distribution, or it can be an analytical (theoretical) distribution, typically a fitted distribution. A fitted distribution or fitted curve preferably means a best fit with respect to some criterion, e.g., a least square fit.

Training statistics data are statistical information derived from process variable values that are captured or measured during a training phase. The training statistics data can be an item or a group of items selected from a group comprising mean value (e.g., arithmetic mean), root mean square, standard deviation, variance, statistical distribution. It can also be a value or set of values (e.g., limit values) derived from one or more members of that group. The statistical distribution can be an empirical distribution or a fitted (theoretical) distribution.

The training processing means is a means (realized in hardware and/or software) for processing process variable values measured (captured) during a training phase, in such a way that training statistics data are generated from the process variable values. The processing can include various types of calculations, e.g., arithmetics or transforms like Fourier or wavelet transform. The training statistics data are recorded (stored) for further output or processing.

The comparison means (realized in hardware and/or software) compares measurement statistics data with training statistics data. From an output of the comparison means it can be deduced that some failure is likely to have occurred in the process. Due to the comparison of statistics data, a sound and reliable basis for a diagnostic output, since a considerable number of process variable values has been evaluated for generating the statistics data. Furthermore, due to the comparison of statistics data, it is possible to estimate or to prescribe the likelihood of the correctness of a diagnostic output. I.e., an output failure (or no-failure) indication can be provided with an indication of a confidence level associated with the failure (or no-failure) indication, or an output failure (or no-failure) indication is given only if the indication has at least a prescribable confidence level (indication of degree of certainty). According, a diagnostic output output from a diagnostic device has a considerable added value if based on the comparison of the measurement statistics data with the training statistics data as realized in the comparison means.

The above-mentioned "means" (receiving means, measurement processing means, training processing means, comparison means, sensing means) could also be referred to as "units". These means, in particular the receiving means, measurement processing means, training processing means and comparison means, can be partially or fully identical, in particular if they are realized in form of software and/or hardware.

In a preferred embodiment the comparison means has a condition output related to a condition of the process, wherein the condition of the process is different from a measure for the process variable. A diagnostic output of the diagnostic device, accordingly, is preferably not a magnitude that would indicate values of the process variable. If, e.g., the process variable is the flow velocity of the process medium, the condition of the process can, e.g., be a condition of a pump, for example indicated by its pumping speed, or a condition of another process device, in particular process control device.

In particular, if the diagnostic device comprises a sensing means, the condition output can be related to the condition of the sensing means. Accordingly, in that case the condition output is related to the condition of the diagnostic device, so that the diagnostic device provides for a self-diagnostic feature.

In another preferred embodiment the measurement statistics data and the training statistics data relate to noise carried in the process medium. Such noise can, e.g., be vibration noise. The noise can stem from a process device.

According to the invention the training processing means calculates a training empirical statistical distribution. The training empirical statistical distribution is a distribution related to process variable values measured during a training phase. In one embodiment, it can be a distribution of process variable values or, more general, of a function of process variable values, e.g. the square of the process variable values or the sum of the squares of the process variable values. In another embodiment, it can be a distribution of values derived from a transform of process variable values.

In the latter embodiment, preferably the measurement processing means calculates a transform of process variable values, which are measured during a measuring phase, into coefficients $X_m(k)$ of a set of orthogonal functions, and the training processing means calculates a transform (of the same type) of process variable values, which are measured during a training phase, into coefficients $X_t(k)$ of the same set of orthogonal functions, and the training empirical statistical distribution is a distribution of a function of the coefficients $X_t(k)$. The training empirical statistical distribution can, e.g., be a distribution of the coefficients $X_t(k)$ or of the coefficients $X_t(k)$ squared; other, preferably arithmetic functions are also possible. Preferably, the orthogonal functions are orthonormal functions.

The transform can preferably be one of the group of Fourier transform and wavelet transform.

According to the invention the training processing means calculates a training analytical distribution function approximating the training empirical statistical distribution. i.e., a prescribable function with one, two or more parameters is fitted to the training empirical statistical distribution. In this way, a maximum of information of high precision is gathered from the measured data, and the influence of statistical deviations during the training phase are reduced.

It has been found that the Gamma distribution function provides for a particularly accurate fit to typical training empirical statistical distributions, at least as far as training empirical statistical distributions of values derived from Fourier coefficients are concerned.

In a preferred embodiment the measurement statistics data comprise a mean value $M_p$ of a function of process variable values, which are measured during a measuring phase. E.g., the mean value $M_p$ can be taken of the process variable values themselves or of the square of the process variable values. The training processing means calculates, as training statistics data or as part thereof, a lower limit value $L_{t,p}$ and an upper limit value $U_{t,p}$ from the training analytical distribution function. And, preferably, the comparison means outputs a failure indication in case that the mean value $M_p$ is smaller than the lower limit value $L_{t,p}$ or greater than the upper limit value $U_{t,p}$. This embodiment has the advantage that the lower limit value $L_{t,p}$ and the upper limit value $U_{t,p}$ can be chosen such that a prescribable (minimum) confidence level of the diagnostic output is achieved, since these limit values are derived from a statistical distribution. Moreover, the precision, with which the limit values, that correspond to a desired (minimum) confidence level, can be determined, is very high, because the limit values are derived from the (fitted) training analytical distribution function. Another advantage of this embodiment is that the processing effort needed for deriving the diagnostic output is relatively low with respect to the quality, in particular the reliability and soundness, of the diagnostic output.

Another preferred embodiment works similarly, but with transformed process variable values, and has corresponding advantages: In that embodiment the measurement statistics data comprise a mean value $M_c$ of a function of the coefficients $X_m(k)$, and the training processing means calculates, as training statistics data or as part thereof, a lower limit value $L_{t,c}$ and an upper limit value $U_{t,c}$ from the training analytical distribution function, and, preferably, the comparison means outputs a failure indication in case that the mean value $M_c$ is smaller than the lower limit value $L_{t,c}$ or greater than the upper limit value $U_{t,c}$. The mean value $M_c$ can, e.g., refer to the coefficients $X_m(k)$ directly or to the coefficients $X_m(k)$ squared or another, preferably arithmetic function of the coefficients $X_m(k)$.

Instead of the mean value, or in addition to it, it is possible to use the variance or the standard deviation in the beforementioned preferred embodiments.

According to the invention the measurement statistics data comprise a measurement empirical statistical distribution, which is a distribution of a function of of such process variable values, which are measured during a measuring phase, and the training statistics data comprise the training analytical distribution function. The comparison means compares the measurement empirical statistical distribution with the training analytical distribution function. The comparison means can output a failure indication dependending on the result of a comparison of the measurement empirical statistical distribution with the training analytical distribution function. Preferably, the comparison means outputs a failure indication in case that the confidence level derived from of a statistical test of the consistency of the measurement empirical statistical distribution with the training analytical distribution function is below a prescribable threshold value. In this embodiment a distribution of currently measured values is calculated and compared, preferably in a statistical test, to an analytical distribution that has been fit to a distribution measured during the training phase. A desired confidence level of the diagnostic output can be chosen through the threshold value.

It is possible, in such an embodiment to compare the measurement empirical statistical distribution with the training empirical statistical distribution instead of with the training analytical distribution function.

Similar to this embodiment, another aspect of the invention has corresponding advantages, but deals with statistical distributions derived from transformed process variable values: In that embodiment the measurement statistics data comprise a measurement empirical statistical distribution, which is a distribution of a function of the coefficients $X_m(k)$ (e.g. a distribution of the coefficients $X_m(k)$ themselves or of the square of the coefficients $X_m(k)$ or . . . ), and the training statistics data comprise the training analytical distribution function. The comparison means can output a failure indication depending on the result of a comparison of the measurement empirical statistical distribution with the training analytical distribution function. Preferably, the comparison means outputs a failure indication in case that the confidence level derived from of a statistical test of the consistency of the measurement empirical statistical distribution with the training analytical distribution function is below a prescribable threshold value. In this embodiment a distribution of coefficients derived from currently measured values is calculated and compared, preferably in a statistical test, to an analytical distribution that has been fit to a distribution derived during the training phase. A desired confidence level of the diagnostic output can be chosen through the threshold value.

It is possible, in such an embodiment to compare the measurement empirical statistical distribution with the training empirical statistical distribution instead of with the training analytical distribution function.

Statistical tests that have been found particularly useful for comparison of distributions in these embodiments are fitting tests, in particular, the $Chi^2$-test and the Kolmogorov-Smirnov-test.

Another embodiment comprises not only diagnostic devices of the above-mentioned kind, but as well transmitters, process control devices, process monitoring devices, and process control systems that comprise such a diagnostic device. The advantages of these correspond to the advantages of the diagnostic devices.

The disclosure can also comprise the steps of:
obtaining process variable values, which are derived from measuring a process variable of a process medium of a process,
extracting and recording measurement statistics data from such process variable values, which are measured during a measuring phase,
extracting and recording training statistics data from such process variable values, which are measured during a training phase, and
comparing the measurement statistics data with training statistics data recorded before the measurement statistics data.

The diagnostic method preferably is a method performed in a process control environment.

Further diagnostic methods according to the invention can be derived from the diagnostic devices according to the invention. The advantages of the methods correspond to the advantages of the diagnostic devices.

Another embodiment comprises furthermore transmitters, process control devices, process monitoring devices, and process control systems, which implement a diagnostic device according to the invention.

Further exemplary embodiments and advantages emerge from the description and the figures.

BRIEF DESCRIPTION OF THE DRAWINGS

Below, the invention is illustrated in more detail by means of preferred embodiments, which are shown in the included drawings. The figures show:

FIG. 6 a block diagram of steps performed in a training processing means;

FIG. 8 a block diagram of steps performed in a measuring processing means;

The reference symbols used in the figures and their meaning are summarized in the list of reference symbols. Generally, alike or alike-functioning parts are given the same reference symbols. The described embodiments are meant as examples and shall not confine the invention.

DETAILED DESCRIPTION

Figure 1:
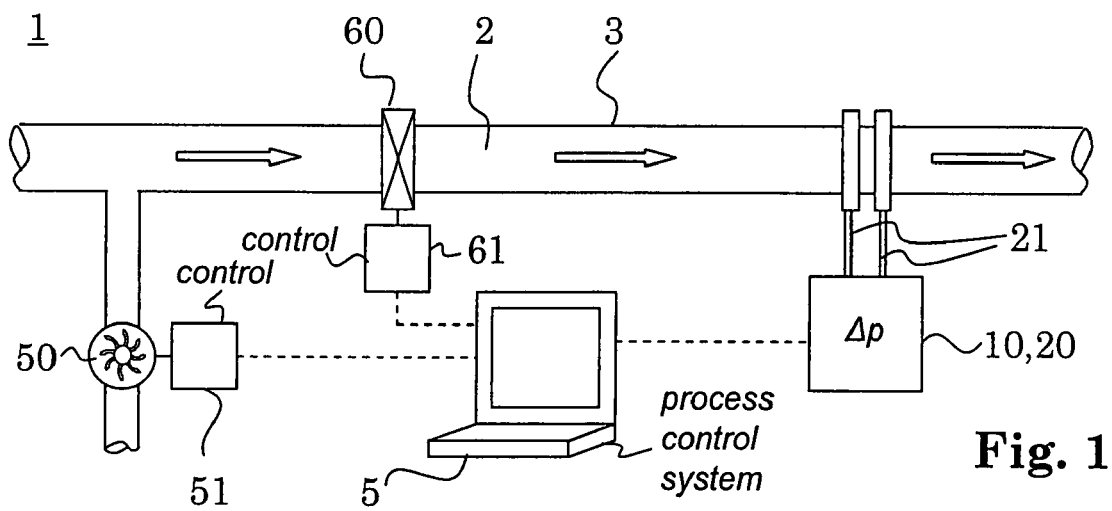
FIG. 1 a schematic illustration of a process control environment including a diagnostic device.

FIG. 1 schematically illustrates a typical process control environment 1 with a diagnostic device 10. The diagnostic device 10 is comprised in a differential pressure transmitter 20, which has two impulse lines 21, through which it is coupled to a process medium 2 of the process control environment 1. The differential pressure transmitter 20 can also be understood as a process monitoring device 20, which monitors a differential pressure in the process medium 2. The process medium 2 can be, e.g., a liquid like water or oil, which is contained in a tube 3. Process control devices like a pump 50 (including a pump control 51) and a valve 60 (including a valve control 61) are provided in the process control environment 1. The process control devices 10, 20, 50, 60 are connected to a typically computer-based process control system 5. The process control system 5 can also be understood as a process control device 5, which (through the connection with the diagnostic device 10) incorporates (comprises) the diagnostic device 10.

Through the flow of the process medium 2 (indicated by arrows) and, in addition, through the process control devices 50, 60, noise is generated in the process medium 2. Such noise can be sensed by means of the diagnostic device 10 in the differential pressure sensor 20. A change in the process conditions, e.g., a malfunction or failure of a process device 20, 50, 60, may be reflected in the sensed differential pressure signal.

Figure 2:
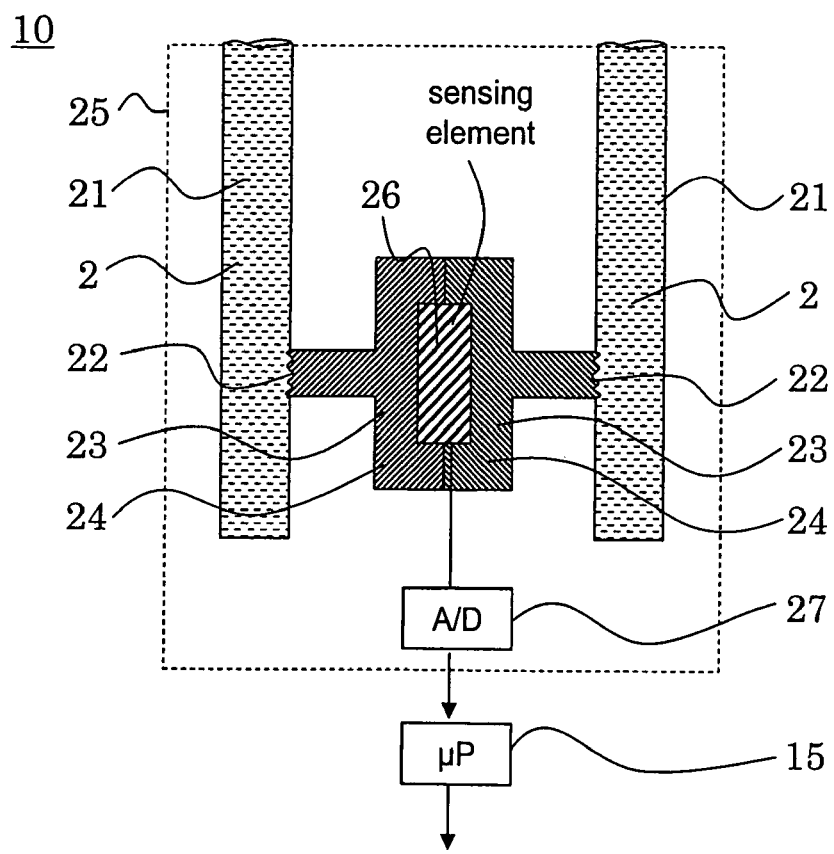
FIG. 2 schematically a diagnostic device with a sensing means, embodying a differential pressure transmitter.

FIG. 2 schematically shows the differential pressure transmitter, which is an example of a diagnostic device 10 with a sensing means 25. The sensing means 25 comprises the two impulse lines 21, which are filled with process medium 2, and a sensing system (sensing element) 26. One process membrane 22 and one pressure transmission arm 23 are provided for each impulse line 21. The pressure transmission arms 23 (oil circuits 23) are filled with oil 24 as a sensing medium 24. The process membranes 22 are an interface between the impulse lines 21 (containing process medium 2) and the oil circuits 23 (containing sensing medium 24). Through the pressure transmission arm 23 the pressures from the process (in the impulse lines 21) is transferred to the sensing system 26.

Among others, the sensing system 26 may be based on one or more of the following principles, which allow to derive an electrically measureable signal from the differential pressure:

Induction (the differential pressure modulates the inductance of a magnetic circuit)

Piezoresistivity (the differential pressure modulates an output voltage of a piezoresistive element)

Capacitance (the differential pressure modulates the capacity of an electric circuit)

The signal derived that way is then digitized in a analogue-to-digital converter 27. A microprocessor 15 of the diagnostic device 10 can then derive diagnostic information from the digitized differential pressure signal.

On the one hand, the diagnostic device 10 can diagnose the condition and failures of various process devices, like 50 and 60. On the other hand (additionally or alternatively), the diagnostic device 10 can also diagnose the condition and failures of the sensing means 25. In particular, the following failures may occur and can be detected by the diagnostic device 10:

1. At least one of the oil circuits 23 has a leak.
2. The interface between the two oil circuits 23 (usually another membrane) is damaged, so that the sensing medium 24 can flow between the two circuits 23.
3. At least one of the process membranes 22 are broken, so that the process medium 2 can flow into at least one of the pressure transmission arm.
4. At least one of the impulse lines 21 are partially or completely plugged.

Frequent reasons for a plugged impulse line (failure 4.) are:

Solid material is present in the process medium 2 and blocks the impulse line 21.

Some sedimentary process takes place in the impluse line 21 and progressively plugs the impulse line (e.g., limestone).

The process medium in the impulse line 21 solidifies, typically because of low temperatures. (This can happen even if the process medium 2 in the rest of the process does not solidify, because the process medium 2 in the impulse lines 21 is mainly still, whereas the process medium 2 in the process is usually flowing and therefore not still.)

It is of considerable to have diagnostic information on the condition of the sensing means 25 (and the diagnostic device 10 or transmitter 20) itself. In particular, if the diagnostic information can distinguish between (some of) the above-mentioned failure modes.

During normal operating, when no device defect (failure) is present, it is advantageous for a diagnostic device, which uses at least two impulse lines (e.g., for a device using a pressure or differential pressure signal derived from these at least two impulse lines), to measures the pressure at two points, which are arranged close to each other. I.e., it is advantageous, when the locations at which the at least two impulse lines are coupled to the rest of the process medium, are in close proximity. The advantage is, that measured absolute values are small, fluctuations in the process fluid are mostly cancelled.

When then a failure like type 1., 3. or 4. (see above) is present, with only one is impulse line (or not all impulse lines) being concerned, the pressure at one side cannot be sensed properly. The consequent asymmetry in the measuring system implies that the pressure fluctuations are not cancelled anymore and are therefore present in the differential pressure signal. This implies that an overall increased signal occurs, in particular with higher frequency components being present, and therefore, the device defect can be diagnosed. If, on the other hand, a failure of type 2, or of type 1., 3. or 4. with both impulse lines being concerned, occurs, the measured signal intensity is strongly decreased, thus allowing to detect such a failure.

Through a further analysis of the process variable data and/or the measurement statistics data more detailed information can be derived, which can allows to more clearly specify the type of occurring failure.

Figure 3:
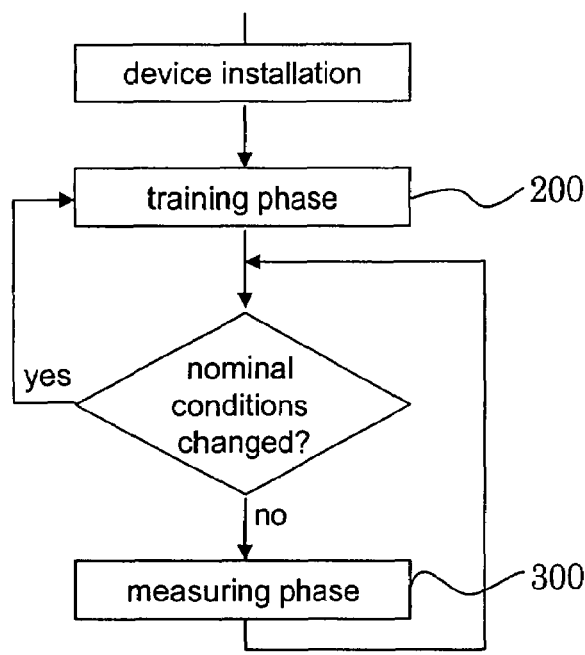
FIG. 3 a block diagram of a basic algorithm of a diagnostic device.

A preferred basic algorithm for the functioning of a diagnostic device 10 according to the invention is sketched in the block diagram in FIG. 3. First, the diagnostic device installed, i.e., mainly the diagnostic device is coupled to the process. Then follows a training phase 200, in which training statistics data are generated. If then the nominal conditions in the process are unchanged, a measuring phase 300 is entered. If, at any time, the nominal conditions in the process are changed, e.g., through installation of a new process device, another training phase 200 is to be absolved before entering measurement mode 300 again.

Figure 4:
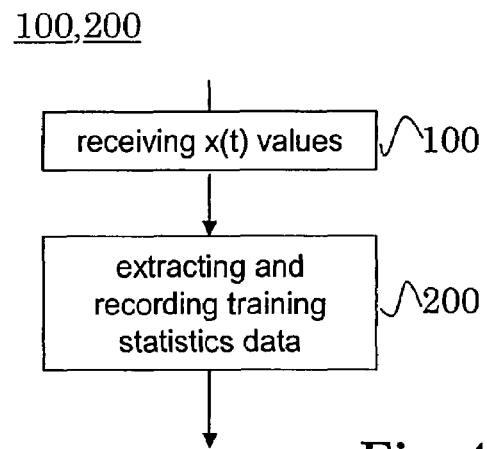
FIG. 4 a block diagram including a training phase of a diagnostic device.

FIG. 4 shows a block diagram including a training phase 200 of a diagnostic device. In a receiving means 100 process variable values x(t), like differential pressure values, are received, e.g., referring to FIG. 2, from the A/D-converter 27. In a training processing means 200, training statistics data are extracted from the process variable values x(t) and recorded. Referring to FIG. 2, the training processing means 200 (like other involved means) may be realized through the microprocessor 15.

Figure 5:
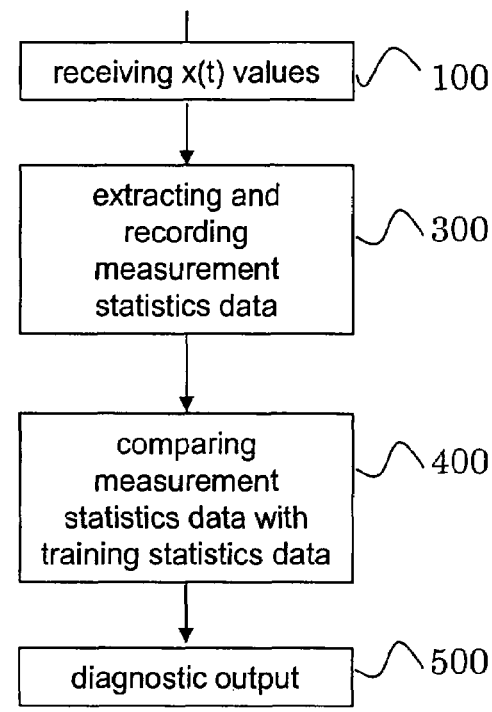
FIG. 5 a block diagram including a measuring phase of a diagnostic device.

FIG. 5 shows a block diagram including a measuring phase 300 of a diagnostic device. In a (or the) receiving means 100 process variable values x(t) are received, e.g., referring ro FIG. 2, from the A/D-converter 27. In a measurement processing means 300, measurement statistics data are extracted from the process variable values x(t) and recorded. Referring to FIG. 2, the measurement processing means 300 may be realized through the microprocessor 15. In a comparison means 400, which also may be realized through the microprocessor 15, the measurement statistics data are compared to the training statistics data. The comparison results in a diagnostic output 500, e.g., indicating a (general) failure of the process or a specific failure.

In the block diagram of FIG. 6, steps performed in an exemplary training processing means 200 are schematically depicted. During a duration δt process variable values x(t) are recorded (step 210). From those process variable values, in step 250, a training empirical statistical distribution is calculated. In step 270, a training analytical distribution function is fitted to the training empirical statistical distribution. This optional fitting of a training analytical distribution function allows to receive very precise data in a minimized time δt.

As shown in step 290, from the training analytical distribution function limit values $L_{t,p}$, $U_{t,p}$ may be derived with high precision. The choice of a prescribable level K allows to choose these limit values $L_{t,p}$, $U_{t,p}$ such that both, the probability of the existence of a value below $L_{t,p}$ and the probability of the existence of a value above $U_{t,p}$, each have a defined value. If the limit values $L_{t,p}$, $U_{t,p}$ shall be chosen such that the probability of the existence of a value below $L_{t,p}$ is equal to the probability of the existence of a value above $U_{t,p}$, usually one prescribable level K will be chosen for finding the lower limit value $L_{t,p}$, and another (different) prescribable level K will be chosen for finding the upper limit value $U_{t,p}$ (not shown in FIG. 6).

Such limit values $L_{t,p}$, $U_{t,p}$ can also be derived from the training empirical statistical distribution itself (directly, without fitting). But the precision is less good and/or the time δt required to record the process variable values x(t) must be chosen longer.

If only the training analytical distribution function or even only the training empirical statistical distribution is used as training statistical data during further steps in a measuring phase, step 290 or even also step 270 can be omitted.

Figure 7:
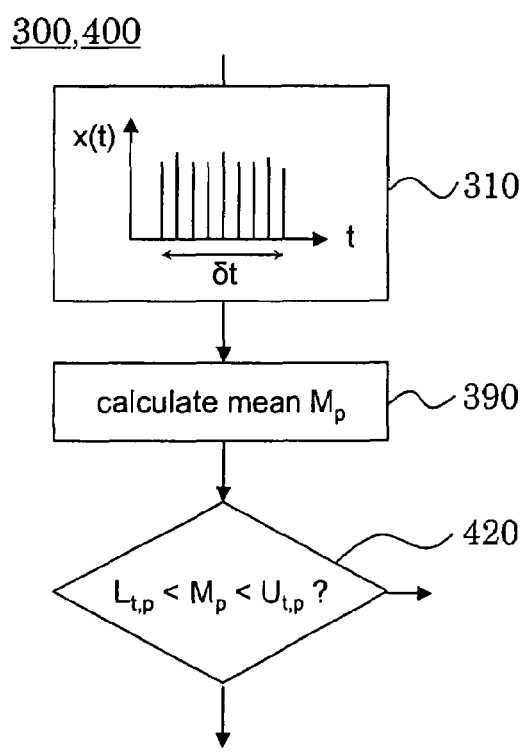
FIG. 7 a block diagram of steps performed in a measuring processing means and a comparison means.

The block diagram of FIG. 7 shows steps that can be performed in a measuring processing means 300 and a comparison means 400. In this embodiment, which can be used in conjunction with the training phase depicted in FIG. 6, firstly, process variable values x(t) are recorded during a time window δt (step 310). The duration δt in the training phase (compare FIG. 6, step 210) is typically of the order of 10 times to 50 times longer than the duration δt during a measuring phase. In step 390, the mean value $M_p$ of the recorded process variable values is calculated. In the comparison means, step 420, measuring statistics data are compared to training statistic data: The mean value $M_p$ is compared to the two limit values $L_{t,p}$, $U_{t,p}$ derived from the training phase (FIG. 6, step 290). If $M_p$ lies within the range given by $L_{t,p}$, $U_{t,p}$, the condition of the process is expected to be in good order. Otherwise, the diagnostic output will be set to "failure".

It is, advantageously, possible to calculate a moving average in step 390. This means that after the calculation of one mean value $M_p$, the next mean value $M_p$ is calculated from process variable values measured in a time interval δt, which overlaps with the time interval δt, in which the process variable values were measured that lead to the former mean value $M_p$. Typically, a large overlap is chosen, in particular such that only the first x(t) value is discarded and a newly measured x(t) value is added, when a next mean value $M_p$ is calculated. Working with a moving average has the advantage that more data and more diagnostic outputs are generated per time, and the data are smoothed, i.e., the effect that singular spikes have is reduced. Alternatively, there is no overlap between the time intervals δt, in which the process variable values are measured that lead to consecutive mean values $M_p$.

In the block diagram of FIG. 8 another possible set of steps that can be performed in a measuring processing means 300 and a comparison means 400 is depicted. In this case a distribution of process variable values x(t) as measurement statistics data is compared to a training statistical distribution function derived in the training (FIG. 6, step 270) as training statistics data. In this embodiment, which can be used in conjunction with the training phase depicted in FIG. 6 (wherein step 290 can be left out), firstly, process variable values x(t) are recorded during a time window δt (step 310). From the x(t) values a measurement statistical distribution is calculated (step 350). In the comparison means the measurement empirical statistical distribution (as measurement statistical data) is compared to the training statistical distribution function (step 450). This comparison is done in a statistical test, e.g., in a $Chi^2$ test. As result of the statistical test a confidence level is derived, which indicates the probability of an agreement between the compared distributions. In case of the $Chi^2$ test, some function scaling inversely with $Chi^2$, like, e.g., $1/Chi^2$, is a possible value indicative of the confidence level. In step 480 the derived confidence level (indicated as $1/Chi^2$) is compared to a prescribable threshold value K'. If the confidence level is below the threshold value K', the diagnostic output will be set to "failure". Otherwise the condition of the process is expected to be in good order.

In this embodiment of FIG. 8, it is also possible to use the training empirical statistical distribution derived in step 250 (FIG. 6) as training statistical data. In that case, the measurement empirical statistical distribution and the training empirical statistical distribution would be subject to a statistical test in step 450.

In analogy to the use of a moving average in conjunction with FIG. 7, it is possible in the embodiment of FIG. 8 to derive consecutive measurement empirical statistical distributions from process variable values measured in overlapping time intervals δt.

In conjunction with the FIGS. 6-8 the mean values and distributions have been described to be such of the process variable values x(t) directly. It can nevertheless be advantageous to calculate the mean values and distributions from a function f(x(t)) of the process variable values. This function f(x) may be $f(x)=x^2$ or subtraction of a constant or another, preferably arithmetic function. Of course, the same function has to be applied during a measuring phase as during a training phase.

The FIGS. 9-12 involve a transform of process variable values or a function of those. A Fourier transform, in particular, an FFT (fast Fourier transform), has been chosen in the Figures, but other transforms, like wavelet transforms are possible as well.

Figure 9:
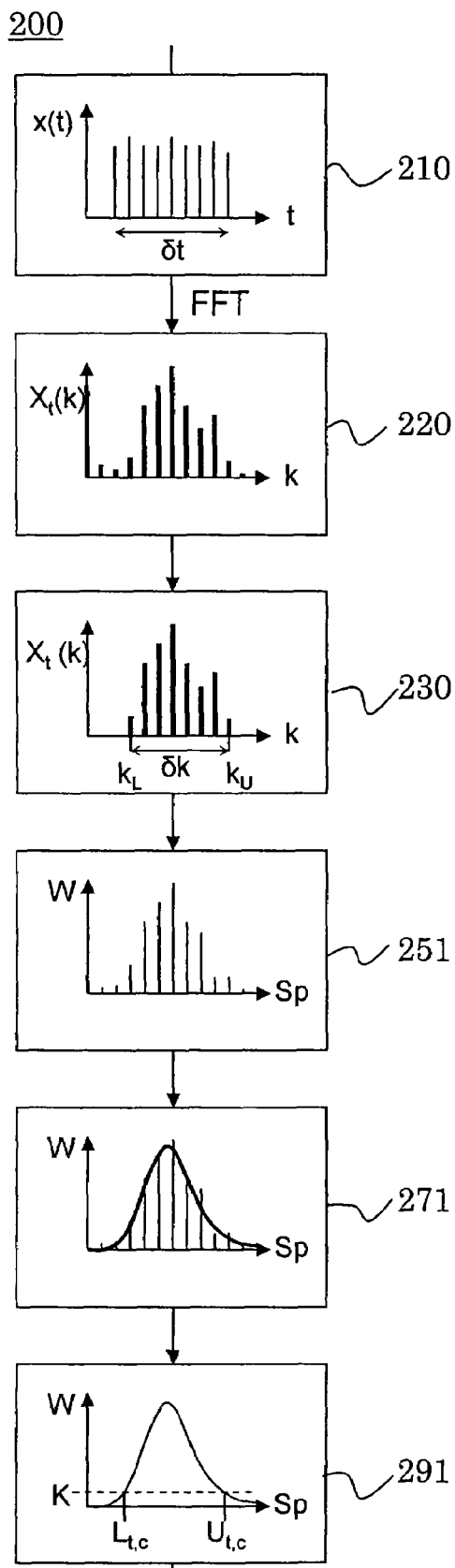
FIG. 9 a block diagram of steps performed in a training processing means, including a Fourier transform.

FIG. 9 shows a block diagram of steps that can be performed in a training processing means involving an FFT. In step 210, process variable values x(t) are taken during a time interval δt. In step 220 an FFT is calculated from the x(t) values, yielding a spectrum of coefficients $X_t(k)$ (the index t shall indicate that these coefficients are derived from values taken during a training phase). Step 230 is optional, but very advantageous. In step 230 an interval of the transformed variable (an interval δk of frequencies k in case of a Fourier transform) is selected. This selection allows to confine further analysis to only those frequencies k, which are of particular interest. In case of many process variables, e.g., in case of differential pressures (compare FIGS. 1-2), the process variable values are rather constant, with only small fluctuations. Accordingly, an FFT of such a signal typically has large value at very low frequencies (at and near 0 Hz), which are not of interest and can be left out by choosing the interval δk accordingly.

An advantageous possible way to automatically find a suitable interval δk is, after leaving out very low frequencies, to calculate a prescribable fraction (e.g., 10%) of the largest coefficient $X_t(k)$ and find the lowest frequency $k_L$ and the largest frequency $k_U$, which have a coefficient ($X_t(k_L)$; $X_t(k_U)$) at least as large as that fraction. The desired interval δk ranges then from $k_L$ to $k_U$.

In step 251 a training empirical statistical distribution is calculated from the spectrum $X_t(k)$. One possibility is to sum up all $X_t(k)$ values or their absolute values, possibly only within the interval δk of interest, to derive a signal power Sp, of which the training empirical statistical distribution is calculated. Accordingly, one spectrum $X_t(k)$ results in one Sp value. It is also possible to do further or other calculations with the coefficients $X_t(k)$ of interest in order to derive a signal power value Sp. The following formulae (in particular equations (2) and (3)) indicate possible calculations:

$$X(k) = \sum_{t=0}^{N-1} x(t)e^{-j\frac{2\pi k}{N}t} \quad (1)$$

$$P(k) = \begin{cases} 2|X(k)|^2 & 1 \le k \le \frac{N}{2} - 1 \\ |X(k)|^2 & k = 1, \frac{N}{2} \end{cases} \quad (2)$$

$$Sp(k_1, k_2) = \sum_{k=k1}^{k2} P(k) \quad (3)$$

As as described before, x(t) is a process variable value taken at time t, k is a frequency, X(k) denotes a coefficient of the spectrum, and Sp is a signal power value. Furthermore, e denotes the base of the natural logarithm, j denotes the square root of −1, and N is the number of measured process variable values within the interval δt. P(k) is an intermediate value for calculating the signal power. $Sp(k_1, k_2)$ is the signal power value derived from a frequency range from $k_1$ to $k_2$. $k_1$ and $k_2$ correspond to the lower and upper limit frequencies $k_L$ and $k_U$ discussed above. Equation (1) is the formula for a discrete Fourier transform.

More general, a number ($\ge 2$) of intervals δk can be chosen which each comprise frequencies of interest, so that the signal power Sp is derived from those frequencies that are in located in one of those intervals.

In the optional step 271, a training analytical distribution function is fitted to the so-derived training empirical statistical distribution of step 251. This is in analogy to step 270 (FIG. 6). In the optional step 291, lower and upper limit values $L_{t,c}$, $U_{t,c}$ may be derived with high precision from the training analytical distribution function, in analogy to step 290 (FIG. 6). Optionally, the limit values $L_{t,c}$, $U_{t,c}$ may be derived directly from the training empirical statistical distribution (220 or 230), without fitting. As training staticstics data can, accordingly, serve one or more of the group of training empirical statistical distribution, training analytical distribution function and limit values $L_{t,c}$, $U_{t,c}$, The mean value of the training empirical statistical distribution or of the training analytical distribution function and/or the variance (or standard deviation) of those may also contribute to the training staticstics data, which are, in a measurement phase, compared to measurement staticstics data.

Figure 10:
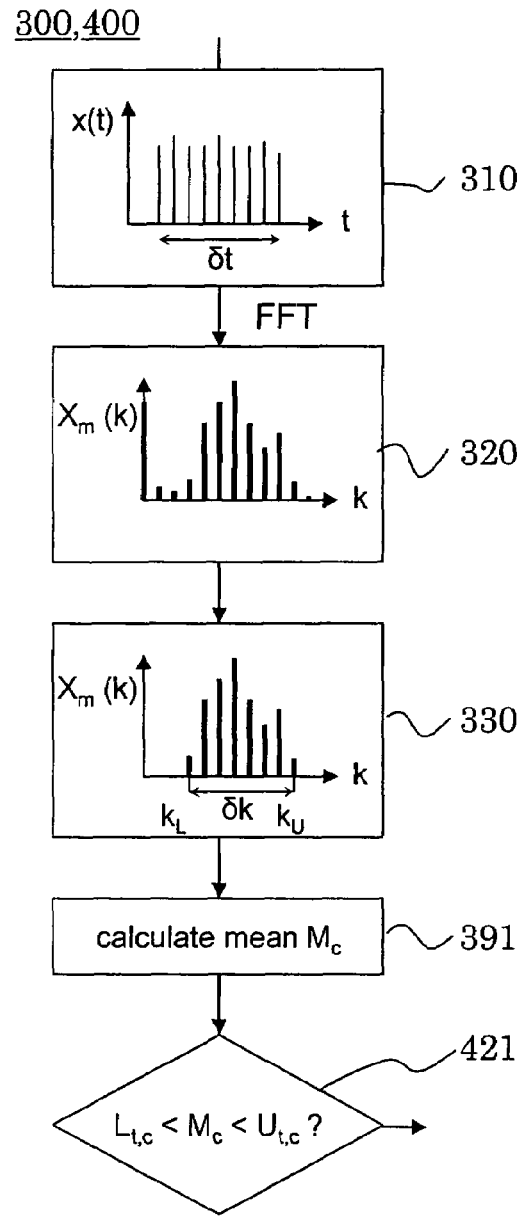
FIG. 10 a block diagram of steps performed in a measuring processing means, including a Fourier transform.

The block diagram of FIG. 10 shows steps that can be performed in a measuring processing means 300 and a comparison means 400. In this embodiment, which can be used in conjunction with the training phase depicted in FIG. 9, firstly, process variable values x(t) are recorded during a time window δt (step 310). This time window δt is as large as the time window used during the training phase (FIG. 9, step 210). Then, in step 320 a Fourier transform is calculated from the x(t) values, yielding a spectrum of coefficients $X_m(k)$ (the index m shall indicate that these coefficients are derived from values taken during a measuring phase). Then, in step 330 the spectum $X_m(k)$ is reduced to the interval δk (or intervals), known from the training (FIG. 9, step 230), if done so in the training phase.

In step 391 signal power values are calculated in the way they were calculated during the training (FIG. 9, step 251), and from the Sp values, a mean value $M_c$ is calculated (approximately analogue to step 390 in FIG. 7). In the comparison means 400, the mean value $M_c$ can the, in step 421, be compared to the limit values derived during the training (FIG. 9, step 291). If $M_c$ lies within the range given by $L_{t,c}$, $U_{t,c}$, the condition of the process is expected to be in good order. Otherwise, the diagnostic output will be set to "failure".

More advanced comparison means 400 can receive from the measurement processing means 300 a measurement empirical statistical distribution (from step 320 or better from step 330) and compare this to the training analytical distribution function (derived in step 271, FIG. 9) or to the training empirical statistical distribution itself (derived in step 220 or better 230 in FIG. 9) (in analogy to FIG. 8, step 450). Preferably, this comparison is a statistical test, like the $Chi^2$ test. According to the result of the comparison, a failure will be diagnosed or not (in analogy to FIG. 8, step 480).

Certainly, it is also possible to fit an analytical distribution function to a distribution derived from data derived during a measurement phase and compare this analytical function with a training analytical distribution function (or even the training empirical statistical distribution). This holds for training and measuring phases involving a transform as well as for such not involving a transform.

In an advanced and preferred comparison means 400 (not illustrated), preferably firstly, a mean value is compared to each limit value found during the training and (then) a measurement-derived distribution is compared to a training-derived distribution (or distribution function). If any of these comparisons indicate a failure condition in the process, the diagnostic output is set to "failure". This comparison means can be employed in case of distributions (or distribution functions) derived with or without a transform.

Figure 11:
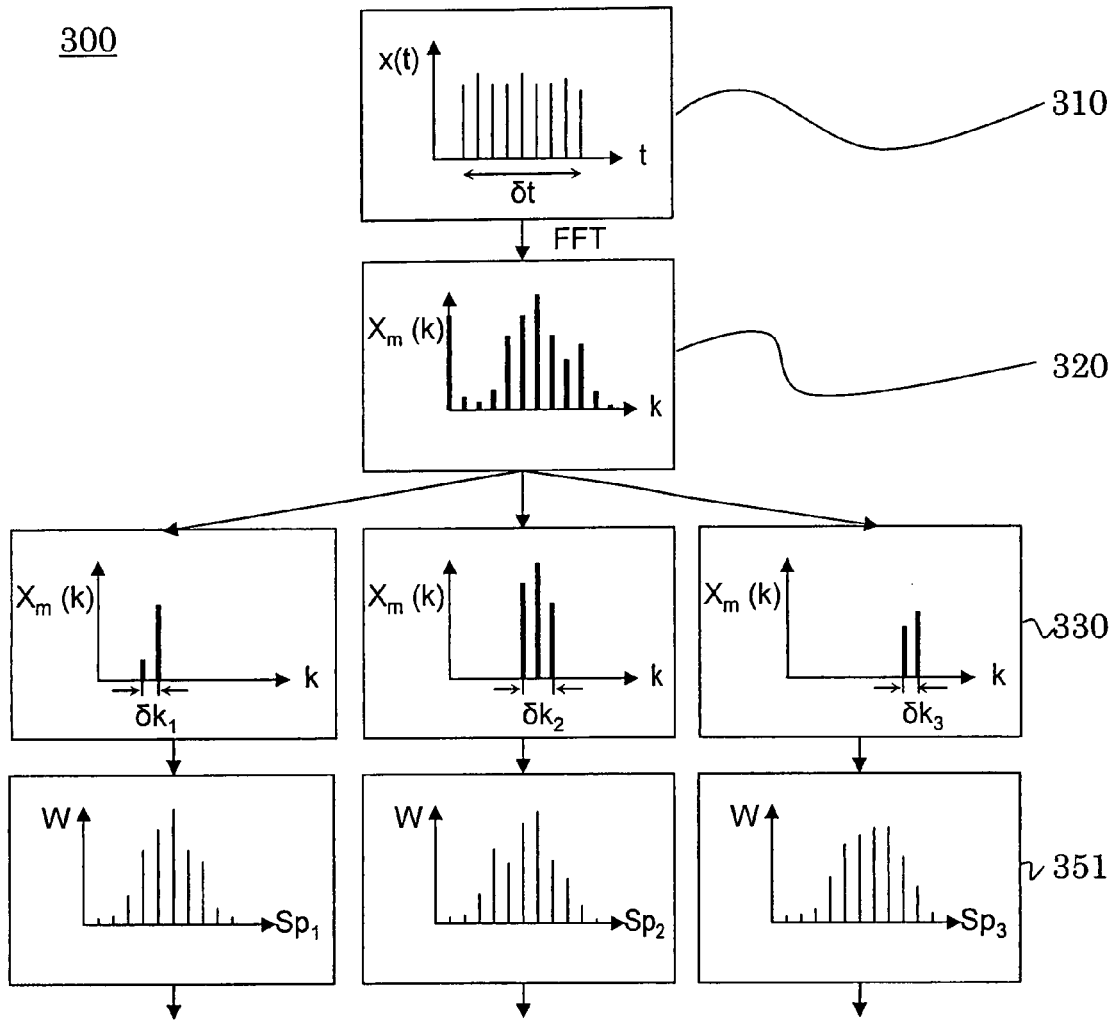
FIG. 11 a block diagram of steps performed in a measuring processing means, including a Fourier transform, using a plurality of frequency bands.

FIG. 11 shows a block diagram of steps that can be performed in an advanced measuring processing means, including a (Fourier) transform. After steps 310 and 320 (compare FIG. 10), a plurality (here: three) of frequency bands $\delta k_1, \delta k_2, \delta k_3$ is chosen in step 330, which bands are then analyzed separately. Certainly, a corresponding training phase must have made the same frequency band separation. For each frequency band $\delta k_1, \delta k_2, \delta k_3$ a separate processing takes place. From one or more of the bands a mean value can be calculated and then compared to limit values derived from the training phase. It is also possible to derive a measurement empirical statistical distribution of spectral power values from one or more of the frequency bands, as is shown in FIG. 11, step 351 for all three bands. Each of these measurement empirical statistical distributions can, e.g., be compared to a corresponding training-derived distribution (or fitted distribution function). A "failure" output can be made, if any of the comparisons of the bands is negative, or if a prescribable number of them is negative.

The division into singly analyzed bands can even be extended to such depth that the full spectrum (each transform-derived coefficient) is separately analyzed, or that certain single frequencies are separately analyzed.

Figure 12:
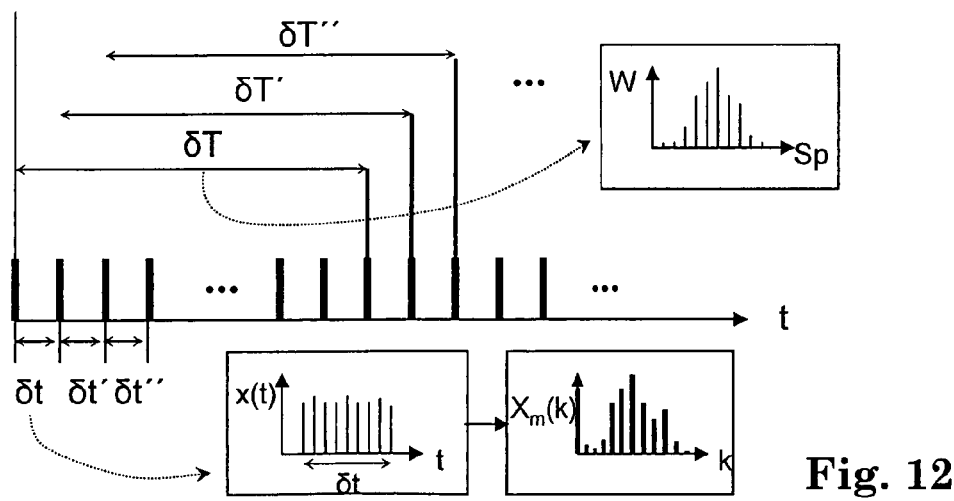
FIG. 12 an illustration of data taking for creating moving "average" values during a measuring phase, including a Fourier transform.

FIG. 12 is an illustration of data taking for creating moving "average" values during a measuring phase, including a Fourier transform. Similar to the comments given above in conjunction with FIGS. 7 (and 8), it is advantageous to use moving values (the term "average" does not always apply here correctly) also in conjunction with transformed data. As shown in FIG. 12, from data taken within a time interval $\delta t$ one set of process variable values and, accordingly, one spectrum $X_m(k)$ is derived, which results in one signal power value Sp (or in a number of separately analyzed Sp values) From a number n (typically 50 to 200) of such spectra or signal power values Sp, one measurement empirical statistical distribution is derived. Accordingly, for one measurement empirical statistical distribution, data have to be acquired during a time interval of a length of $\delta T = n \times \delta t$. In order to have "moving values", the next interval $\delta T'$ will overlap with the former interval ($\delta T$), preferably with a shift of $1 \times \delta t$. In analogy, this is also done when deriving mean values instead of measurement empirical statistical distributions.

In the cases discussed above, in which a mean value is calculated, it is alternatively or additionally possible to calculate a variance or another statistical magnitude and continue with this in the comparison means.

An advantage of the comparison of measurement statistics data with training statistics data is, that a prescribable level of confidence for the diagnostic output can be chosen and/or a level (K, K', $1/Chi^2$, ...) relating to the confidence level can be part of the diagnostic output and thus indicate a to a user how trustful the failure or no failure indication is.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols

| | |
|---|---|
| 1 | process control environment |
| 2 | process medium, process fluid |
| 3 | tube |
| 5 | process control system |
| 10 | diagnostic device |
| 15 | microprocessor |
| 20 | differential pressure transmitter |
| 21 | impulse line |
| 22 | process membrane |
| 23 | pressure transmission arm, oil circuit |
| 24 | sensing medium, oil |
| 25 | sensing means |
| 26 | sensing element, sensing system |
| 27 | A/D converter |
| 50 | pump |
| 51 | pump control |
| 60 | valve |
| 61 | valve control |
| 100 | receiving means; process variable value reception |
| 200 | training processing means; training phase; training mode |
| 210 | recording of process variable values |
| 220 | transform, Fourier transform, FFT |
| 230 | calculation of range in transform space, calculation of frequency range |

250,251 calculation of training statistics data; calculation of training empirical statistical distribution; training empirical statistical distribution 270,271 fitting of training analytical distribution function to training empirical statistical distribution; training analytical distribution function 290,291 calculation of training statistics data; calculation of limit values 300 measurement processing means; measuring phase; measuring mode 310 recording of process variable values 320 transform, Fourier transform, FFT 330 calculation of range-confined measurement empirical statistical distribution (in transform space)

350,351 calculation of measurement statistics data; calculation of measurement empirical statistical distribution; measurement empirical statistical distribution 390 calculation of measurement statistics data; calculation of mean value $M_p$ 391 calculation of measurement statistics data; calculation of mean value $M_c$
400 comparison means; comparison of measurement statistics data with training statistics data
420 comparison of mean value $M_p$ with training statistics data
421 comparison of mean value $M_c$ with training statistics data
450 statistical test, test of consistency of measurement empirical statistical distribution with training analytical distribution function
480 comparison of confidence level with prescribed level
500 diagnostic output, condition output, output means, display
$\delta k$, $\delta k_1$, $\delta k_2$, $\delta k_3$ range in transform space, frequency range
$\delta t$ duration of recording of one set of process variable values, time window, duration
K,K' prescribable level
k transform variable, frequency
$k_L,k_U,k_1,k_2$ limit values in transform space, frequency limits
$L_{t,p},L_{t,c}$ lower limit value
$M_c$ mean value of transform coefficients, mean value of a function of transform coefficients
$M_p$ mean value of process variable values, mean value of a function of process variable values
$Sp,Sp_1,Sp_2,Sp_3$ signal, function of transformed process variable values, signal power
t time
$U_{t,p},U_{t,c}$ upper limit value,
W statistical distribution, distribution function
$X(k)$, $X_m(k)$, $X_t(k)$ transform, discrete transform, discrete Fourier transform, coefficient
x(t) process variable value (taken at various times)

What is claimed is:

1. A diagnostic device comprising:
a receiving means for receiving process variable values of a process variable of a process medium of a process,
a measurement processing means for extracting and recording measurement statistics data from such process variable values, which are measured during a measuring phase,
a training processing means for extracting and recording training statistics data from such process variable values which are measured during a training phase, for calculating a training empirical statistical distribution whereby the distribution is a distribution of a function of process variable values which are measured during a training phase, and for calculating a training analytical distribution function approximating the training empirical statistical distribution, and
a comparison means for comparing the measurement statistics data with training statistics data recorded before the measurement statistics data,
wherein the measurement statistics data comprise a measurement empirical statistical distribution, which is a distribution of a function of such process variable values, which are measured during a measuring phase, and wherein the training statistics data comprise the training analytical distribution function, and wherein the comparison means outputs a failure indication when a confidence level derived from a statistical test of a consistency of the measurement empirical statistical distribution with the training analytical distribution function is below a prescribable threshold value.

2. The diagnostic device according to claim 1, comprising a sensing means for measurement of the process variable and for generating the process variable values.

3. The diagnostic device according to claim 1, wherein the comparison means has a condition output related to a condition of the process, wherein the condition of the process is different from a measure for the process variable.

4. The diagnostic device according to claim 3, wherein the condition output is related to a condition of a sensing means.

5. The diagnostic device according to claim 1, wherein the measurement statistics data and the training statistics data relate to noise carried in the process medium.

6. The diagnostic device according to claim 5, wherein the measurement processing means calculates a transform using one of the group of Fourier transform and wavelet transform.

7. The diagnostic device according to claim 6, wherein the training analytical distribution function is a Gamma distribution function.

8. The diagnostic device according to claim 1, wherein the statistical test is one of the group of $Chi^2$-test and Kolmogorov-Smirnov-test.

9. A diagnostic device according to claim 1, in combination with a process control system.

10. A diagnostic device comprising:
a receiving means for receiving process variable values of a process variable of a process medium of a process,
a measurement processing means for extracting and recording measurement statistics data from such process variable values, which are measured during a measuring phase and for calculating a transform of process variable values, which are measured during a measuring phase, into coefficients $X_m(k)$ of a set of orthogonal functions,
a training processing means for extracting and recording training statistics data from such process variable values which are measured during a training phase for calculating a training empirical statistical distribution, for calculating the transform of process variable values, which are measured during the measuring phase, into the coefficients $X_m(k)$ of a set of orthogonal functions, whereby the training empirical statistical distribution is a distribution of functions of the coefficients $X_t(k)$, and for calculating a training analytical distribution function approximating the training empirical statistical distribution, and
a comparison means for comparing the measurement statistics data with training statistics data recorded before the measurement statistics data,
wherein the measurement statistics data comprise a measurement empirical statistical distribution, which is a distribution of the functions of the coefficients $X_m(k)$, and
wherein the training statistics data comprise the training analytical distribution function, and
wherein the comparison means outputs a failure indication when a confidence level of a statistical test of a consistency of the measurement empirical statistical distribution with the training analytical distribution function is below a prescribable threshold value.

11. The diagnostic device according to claim 10, comprising a sensing means for measurement of the process variable and for generating the process variable values.

12. The diagnostic device according to claim 11, wherein the comparison means has a condition output related to a condition of the process, wherein the condition of the process is different from a measure for the process variable.

13. The diagnostic device according to claim 12, wherein the condition output is related to the condition of the sensing means.

14. The diagnostic device according to claim 10, wherein the measurement statistics data and the training statistics data relate to noise carried in the process medium.

15. The diagnostic device according to claim 10, wherein the statistical test is one of the group of Chi$^2$-test and Kolmogorov-Smirnov-test.

16. A diagnostic device according to claim 10, in combination with a process control system.

17. A diagnostic method that is performed by a diagnostic device, the methods comprising:

Obtaining, in a receiving unit of the diagnostic device, process variable values, which are derived from measuring a process variable of a process medium of a process, transforming and recording, in a measurement unit of the diagnostic device, measurement statistics data relating to noise carried in the process medium from such process variable values, which are measured during a measuring phase, transforming and recording, in a training unit of the diagnostic device, training statistics data relating to noise carried in the process medium from such process variable values, which are measured during a training phase, calculating, in the training unit of the diagnostic device, a training empirical statistical distribution whereby the distribution is a distribution of a function of process variable values which are measured during a training phase, calculating, in the training unit of the diagnostic device, a training analytical distribution function approximating the training empirical statistical distribution, comparing, in a comparison unit of the diagnostic device, the measurement statistics data with training statistics data recorded before the measurement statistics data, wherein the measurement statistics data comprise a measurement empirical statistical distribution, which is a distribution of a function of such process variable values, which are measured during a measuring phase, and wherein the training statistics data comprise the training analytical distribution function, and outputting, from the comparison unit of the diagnostic device, a failure indication when a confidence level derived from a statistical test of the consistency of the measurement empirical statistical distribution with the training analytical distribution function is below a prescribable threshold value.

18. A diagnostic method that is performed by a diagnostic device, the methods comprising:

Obtaining, in a receiving unit of the diagnostic device, process variable values, which are derived from measuring a process variable of a process medium of a process, extracting and recording, in a measurement unit of the diagnostic device, measurement statistics data relating to noise carried in the process medium from such process variable values, which are measured during a measuring phase, calculating, in a training unit of the diagnostic device a transform of process variable values, which are measured during a measuring phase, into coefficients $Xm(k)$ of a set of orthogonal functions, extracting and recording in the training unit of the diagnostic device, training statistics data relating to noise carried in the process medium from such process variable values, which are measured during a training phase, calculating, in the training unit of the diagnostic device, a training empirical statistical distribution, calculating, in the training unit of the diagnostic device, a transform of process variable values, which are measured during a measuring phase, into the coefficients $Xm(k)$ of a set of orthogonal functions, whereby the training empirical statistical distribution is a distribution of a function of the coefficients $Xt(k)$, calculating, in the training unit of the diagnostic device, a training analytical distribution function approximating the training empirical statistical distribution, comparing, in a comparison unit of the diagnostic device, the measurement statistics data with training statistics data recorded before the measurement statistics data, wherein the measurement statistics data comprise a measurement empirical statistical distribution, which is a distribution of the function of the coefficients $Xm(k)$, and wherein the training statistics data comprise the training analytical distribution function, and outputting, from the comparison unit of the diagnostic device, a failure indication when a confidence level of a statistical test of the consistency of the a measurement empirical statistical distribution with the training analytical distribution function is below a prescribable threshold value.

* * * * *